US008181870B2

(12) United States Patent
Bov, Jr.

(10) Patent No.: US 8,181,870 B2
(45) Date of Patent: May 22, 2012

(54) SELF-ALIGNING MICR LINE TREATMENT APPLICATOR

(75) Inventor: Raphael F. Bov, Jr., Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 966 days.

(21) Appl. No.: 12/181,524

(22) Filed: Jul. 29, 2008

(65) Prior Publication Data

US 2010/0027850 A1 Feb. 4, 2010

(51) Int. Cl.
*G06K 7/00* (2006.01)

(52) U.S. Cl. ........ 235/435; 235/375; 235/436; 235/449; 235/487; 235/492; 235/493; 382/137; 382/139; 382/140

(58) Field of Classification Search .................. 235/375, 235/435, 436, 487, 492, 493, 495; 382/112, 382/139, 137, 140
See application file for complete search history.

(56) References Cited

U.S. PATENT DOCUMENTS

| | | | | |
|---|---|---|---|---|
| 4,901,114 | A | 2/1990 | Parker et al. | |
| 5,341,193 | A * | 8/1994 | Hubble et al. | 399/49 |
| 5,540,338 | A * | 7/1996 | Stevens et al. | 209/534 |
| 6,011,935 | A | 1/2000 | Matsuzaka et al. | |
| 6,032,004 | A | 2/2000 | Mirabella, Jr. et al. | |
| 6,155,483 | A | 12/2000 | Chupka et al. | |
| 7,494,052 | B1 * | 2/2009 | Carpenter et al. | 235/379 |
| 2006/0088199 | A1 * | 4/2006 | Shizuka et al. | 382/137 |
| 2007/0290053 | A1 * | 12/2007 | Bov et al. | 235/493 |
| 2008/0075507 | A1 | 3/2008 | Anderson et al. | |
| 2008/0137939 | A1 * | 6/2008 | Wang et al. | 382/139 |

* cited by examiner

*Primary Examiner* — Ali Sharifzada
(74) *Attorney, Agent, or Firm* — Gibb I.P. Law Firm, LLC

(57) ABSTRACT

A magnetic character recognition (MICR) encoding device has a treatment station that applies a chemical treatment to the blank region as the sheets pass along the sheet path that compensates for a fuser release agent that a marking station uses. If blank region was not treated, the fuser release agent might detrimentally affect the printing of the additional magnetic ink markings. In order to properly align the blank region with the treatment station, the embodiments herein include at least one read head that is positioned before the treatment station along the sheet path. A controller analyzes the signals from the read head to determine whether the magnetic ink markings are aligned with the treatment station.

20 Claims, 3 Drawing Sheets

SELF-ALIGNING MICR LINE TREATMENT APPLICATOR

BACKGROUND AND SUMMARY

Embodiments herein generally relate to a magnetic ink character recognition (MICR) encoding device, and more particularly, concerns a MICR encoding device that uses magnetic heads to align a blank region of a MICR print band with any device.

Check printing is a unique application in that the quality of the output is determined by a third party, some days, weeks or months after the check is printed. Poor performance in the payments system requires manual intervention, and penalty fees are assessed when performance falls below a bank's threshold of pain. In addition, processing requires the check to be both readable, and encodable with additional machine-readable information.

The first step in check processing is the reconciliation of the debits represented by the checks against the credit defined by the deposit ticket. The MICR line on all issued checks contains a blank area to the right, called the Amount Field, where the bank of first deposit (BOFD) encodes the amount of the check (see the blank region 202 in FIG. 2, discussed below). In this "proof of deposit" step, the BOFD encodes all the check amounts in the MICR Amount field, and then puts the total amount of the deposit on the deposit ticket amount field for crediting to the customer's account. This assures that each transaction is in balance at the point where the checks begin processing.

This Amount field, or proof encoding is done with high-transfer impact and thermal ribbon technologies. Typing-on-copy issues surfaced when functional release agents within MICR encoders became popular. One problem occurred because there was an interaction between ribbon typewriters and the functional oil used in the fuser release agents. MICR amount encoding can suffer from the same issue.

Further, some color printing/encoding devices use an amino-functional oil, and this release agent has caused MICR encoding issues. There are some approaches for mitigating the negative effect of release agents in MICR applications. One approach involves the application of an aqueous wax to the areas that will be subject to subsequent printing/encoding (e.g., the Amount Field (blank area)). Inclusion of a dye allows the wax application to be seen, so an operator can verify that the wax applicator is properly aimed at the start of a job. However, visibility does not guarantee proper application throughout the job. A second issue for consideration is that a MICR job may not have a check on every sheet. It is desirable for both economic and aesthetic reasons to only treat MICR documents intended for processing, and not to treat intervening blank sheets.

In order to insure proper placement for a MICR line treatment, embodiments herein determine the location of the MICR characters (and the corresponding location of the Amount Field (blank area)) by magnetic sensing of the location of the MICR print band. Alignment of the treatment mechanism (or any other device) is then based on the signal produced by the sensors. Embodiments herein can use, for example, an inexpensive, short gap magnetic head, similar to those used to read credit cards, to align the MICR print band with the treatment applicator.

Positions of the printed MICR characters up or down relative to the read head, reduces the strength of the signal produced by the head. Correction of head (and thus applicator) location restores the proper head response and insures the application location is correct in the cross process direction. Process direction location is triggered by the paper lead edge under software control.

Thus, embodiments herein include a magnetic character recognition (MICR) encoding device that has a sheet path that transports sheets, and a magnetic ink marking station positioned along the sheet path. The magnetic ink marking station places magnetic ink markings on the sheets and the sheets include a blank region (that is aligned with the magnetic ink markings) that will receive additional magnetic ink markings later.

In order to prepare the blank region to receive the additional magnetic ink markings, the apparatus also includes a treatment station positioned along the sheet path. The treatment station applies a chemical treatment to the blank region as the sheets pass along the sheet path that compensates for a fuser release agent that the marking station uses. If the blank region was not treated, the fuser release agent might detrimentally affect the printing of the additional magnetic ink markings.

In order to properly align the blank region with the treatment station, the embodiments herein include at least one magnetic read head that is positioned before the treatment station along the sheet path. In other words, the sheets pass the read head before the sheets pass the treatment station as the sheets are moving along the sheet path within the apparatus. The read head is positioned so that the read head can sense the fields produced by the magnetic ink markings as the sheets travel along the sheet path.

In addition, the apparatus includes a controller that is operatively connected to the read head. The controller analyzes the signals from the read head to determine whether the magnetic ink markings are aligned with the treatment station. A substantial change in the strength of the signal received from the read head would indicate misalignment. The controller can include various signal filters such as a low pass filter. Such filters process the signal received from the read head to make the signal more homogenous irrespective of the different shapes of the different magnetic ink characters that can be included within the magnetic paint markings. Some embodiments herein can use multiple read heads to determine a direction of misalignment according to a difference between signals produced by the read heads.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, fuser release agents containing amino-functionality can interfere with subsequent magnetic ink character recognition (MICR) encoding. Chemical and cleaning treatments can be used to mitigate the negative effect of the fuser release agents, but the chemical treatments must be aligned to a specific area on the document. One issue is that such errors may only be evident much later, such as when the check is rejected at the bank.

Figure 1:
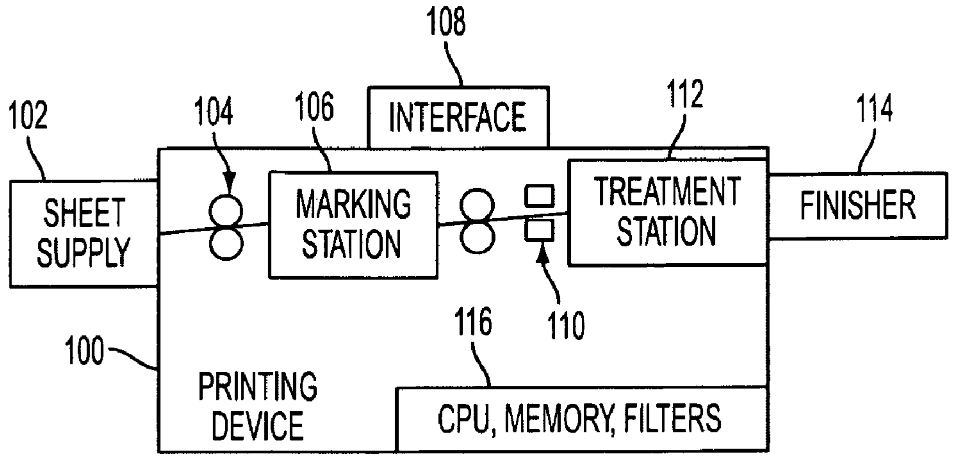
FIG. 1 is a schematic diagram of an encoding device according to embodiments herein.

Therefore, embodiments herein include a magnetic character recognition (MICR) encoding device, such as the printing device 100 shown in FIG. 1. One ordinarily skilled in the art would understand that the structure illustrated in FIG. 1 is merely an example of the ways in which the embodiments herein can be implemented, and the embodiments herein are not limited to the structure illustrated in FIG. 1.

Figure 2:
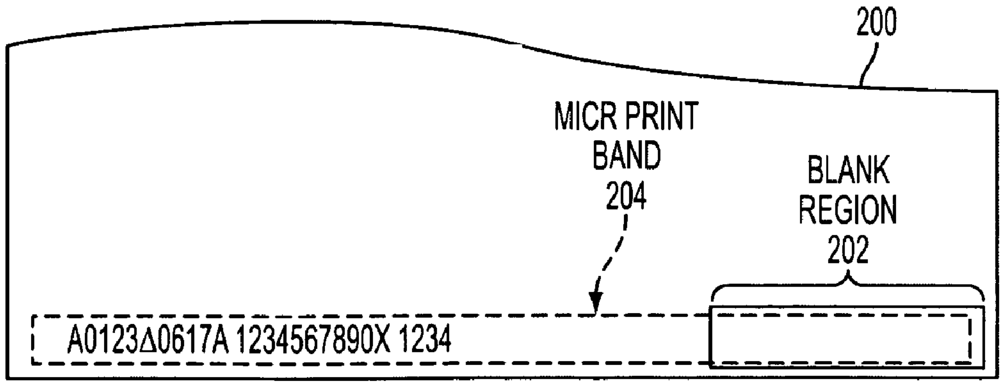
FIG. 2 is a schematic diagram of a sheet with MICR markings.

The encoding or printing device 100 shown in FIG. 1 includes a sheet supply 102 that can store blank sheets upon which magnetic ink character markings can be placed. The sheets are fed along a sheet path 104 that transports sheets. A magnetic ink marking station 106 is positioned along the sheet path 104. The magnetic ink marking station 106 places magnetic ink markings on the sheets. After being marked, the sheets become some form a secure document, such as a negotiable instrument (e.g., check, bond, certificate, ticket, etc.) or other form a magnetically identifiable document that includes magnetic ink markings. Such documents are easily subjected to automated processing and are difficult to forge. To provide a limited example, magnetic ink markings are shown in FIG. 2 in the MICR print band 204 of a sheet 200 (which could comprise, in this example, a portion of check). Further, the sheet 200 includes a blank region 202 (that is aligned with the magnetic ink markings) that will receive additional magnetic ink markings later by the BOFD after the checks exit the printing device 100.

In order to prepare the blank region 202 to receive the additional magnetic ink markings, the apparatus can also include a treatment station 112 positioned along the sheet path 104. The treatment station 112 applies any appropriate form of treatment, such as a chemical treatment to the blank region 202 as the sheets pass along the sheet path 104 that compensates for a fuser release agent that the marking station 106 uses or a treatment that protects the MICR line by applying a protective coating. If blank region 202 was not treated, the fuser release agent might detrimentally affect the printing of the additional magnetic ink markings that will be placed in the blank region 202.

In order to properly align the blank region 202 with the treatment station 112, the embodiments herein include at least one read head 110 that is positioned before the treatment station 112 along the sheet path 104. In other words, the sheets pass the read head 110 before the sheets pass the treatment station 112 as the sheets are moving along the sheet path 104 within the apparatus. The read head 110 is positioned so that the read head 110 can sense the fields produced by the magnetic ink markings as the sheets travel along the sheet path 104.

In addition, the apparatus includes a controller 116 that is operatively connected to the read head 110. The controller 116 analyzes the signals from the read head 110 to determine whether the magnetic ink markings are aligned with the treatment station 112. A substantial change in the strength of the signal received from the read head 110 would indicate misalignment, which can be reported to the operator through the interface 108 so that the operator can correct the alignment. Also, the controller could automatically correct alignment itself, alerting the operator only when the controller fails to correct properly.

The controller 116 can include a processor (e.g., central processing unit (CPU); electronic computer memory storing instructions that can be executed by the CPU to perform various functions described herein; various signal filters, such as a low pass filter, a low pass filter, etc.). Such filters process the signal received from the read head 110 to make the signal more homogenous irrespective of the different shapes of the different magnetic ink characters that can be included within the magnetic paint markings.

Figure 3:
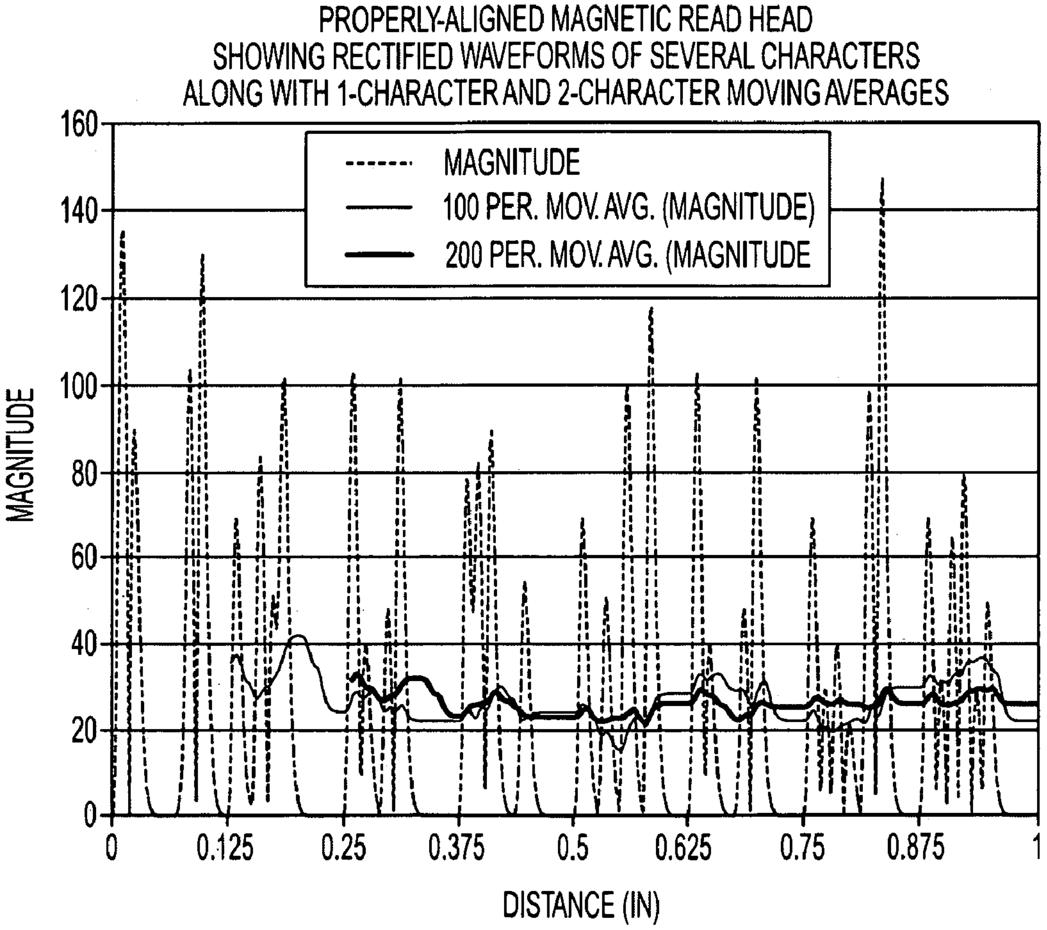
FIG. 3 is a chart illustrating signals received from a read head when the blank region is properly aligned with the treatment station.
Figure 4:
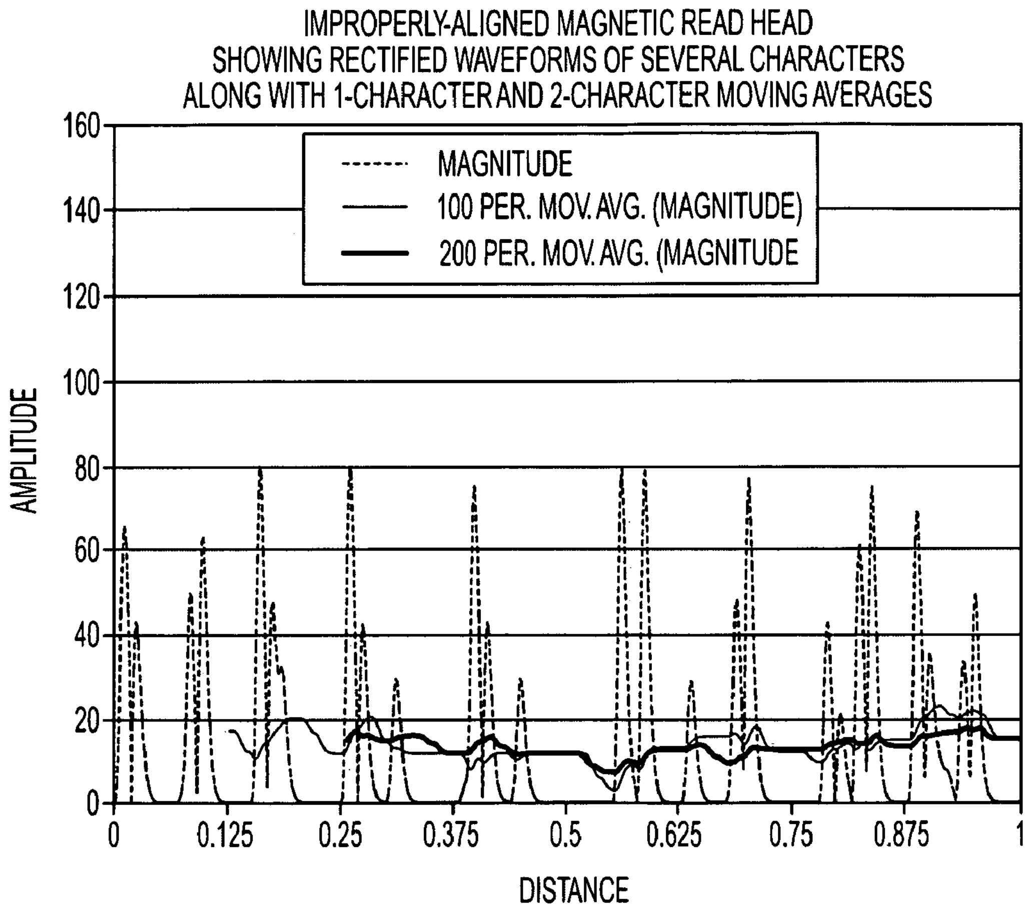
FIG. 4 is a chart illustrating signals received from a read head when the blank region is not properly aligned with the treatment station.

For example, FIG. 3 is a chart illustrating signals received from a read head when the blank region is properly aligned with the treatment station and FIG. 4 is a chart illustrating signals received from a read head when the blank region is not properly aligned with the treatment station. More specifically, the moving average shown in FIG. 4 is too low for the MICR print band 202 to be properly aligned with the read head 110. Each of the signals shown in FIGS. 3 and 4 had a low-pass filter applied, and utilized the magnitude of the moving average of the signal to evaluate whether the signal strength was high enough to indicate that the MICR printed line was properly aligned with the read head (and therefore properly aligned with the treatment station 112).

Thus, as shown above, the read heads 110 sense the presence and exact location of a MICR line on each sheet. The head 110 is mechanically aligned to the treatment station 112 so that when the head 110 is centered on the MICR code line 204, the treatment station 112 is also centered on code line 204. Misalignment is sensed as a drop in head output voltage as only part of the MICR line passes under the head. As shown in FIGS. 3 and 4, the characteristic waveform of MICR characters also allows the head to distinguish between MICR and other printing, so this system also limits treatment to actual MICR documents. Therefore, the embodiments herein only apply the chemical treatment or protective coating to the actual blank regions 202 and skip any sheets that do not include a MICR print band 204.

MICR is a character recognition technology, so every character has a unique time-varying voltage profile output from the read head. This voltage output can be used for character recognition, but real-time recognition is not trivial, nor is it required for the embodiments herein. The voltage variations across characters that allow recognition can be substantially eliminated by rectification and low-pass filtering. As shown in FIGS. 3 and 4, the output for arbitrary characters becomes substantially constant because of the processing performed by the processor 116.

When the head is misaligned by half a character (e.g., 0.060"); so that only half the character passes under the read head, the time-varying head output voltage changes substantially, as shown by a comparison of FIGS. 3 and 4. More specifically, the rectified and filtered waveform is again substantially constant, albeit reduced. Correction can be made based on a peak-hold approach (maximum values are 147 and 79.7 in FIGS. 3 and 4 respectively) or plain integration (average values are 18.1 and 9.36 respectively).

Some embodiments herein can use multiple read heads 110 (as shown in FIG. 1) to determine a direction of misalignment according to a difference between signals produced by the read heads 110. In a single-head implementations, the aligning module cannot sense direction, so the locating mechanism must try one direction and look for increased output voltage. If the voltage falls, it made the wrong choice and must reverse and verify increased voltage. In a dual head implementation, two head are mounted so that each head reads part of a MICR character. Alignment is maintained by keeping the averaged output voltages equal. As alignment drifts, one head or the other produces a reduced output voltage giving the alignment module an unambiguous correction.

Many of the components illustrated in FIG. 1 are well known to those ordinarily skilled in the art; although the novel arrangement and usage of such components to align the blank region with the treatment station shown in FIG. 1, is not previously known. For example, see U.S. Pat. Nos. 4,901,114 (which discloses Xerography using a MICR toner in combination with a non-MICR toner); 6,011,935 (which discloses a MICR image formation system); and 6,155,483 (which discloses a read head capable of reading MICR characters); and U.S. Patent Publications 2007/0290053 (which discloses cleaning toner release agents from MICR print areas); and 2008/0075507 (which discloses inline wax coating process for Xerographically prepared MICR documents); the complete disclosures of which are incorporated herein by reference. Therefore, a detailed discussion of such components is not included herein to allow the reader to focus on the salient aspects of the invention.

Further, many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA, and the details of such devices are not discussed herein for purposes of brevity and reader focus.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. An apparatus comprising:

a sheet path transporting sheets, said sheets having a code line and said code line having magnetic ink markings and a blank region aligned with said magnetic ink markings;

a treatment station positioned along said sheet path, said treatment station applying a chemical treatment to said blank region as said sheets pass along said sheet path;

at least one read head, said read head being positioned along said sheet path such that said sheets pass said read head before said sheets pass said treatment station and said read head further being mechanically aligned with said treatment station so that, when said read head is centered on said code line, said treatment station is centered on said code line; and a controller operatively connected to said read head, said controller analyzing signals from said read head to determine whether said read head is centered on said magnetic ink markings in said code line as said sheets pass said read head and, based on said analyzing, automatically adjusting a position of said read head to ensure that said treatment station is centered on said code line when said sheets subsequently pass said treatment station.

2. The apparatus according to claim 1, said controller determining whether said read head is centered on said magnetic ink markings based upon a strength of a signal received from said read head.

3. The apparatus according to claim 1, said chemical treatment performed by said treatment station preparing said blank region of said sheets to receive additional magnetic ink markings.

4. The apparatus according to claim 1, said magnetic ink markings comprising magnetic ink character recognition (MICR) markings.

5. The apparatus according to claim 1, said sheets comprising negotiable instruments subjected to automated processing.

6. An apparatus comprising:

a sheet path transporting sheets, said sheets having a code line and said code lien having magnetic ink markings and a blank region aligned with said magnetic ink markings;

a treatment station positioned along said sheet path, said treatment station applying a chemical treatment to said blank region as said sheets pass along said sheet path;

at least one read head, said read head being positioned along said sheet path such that said sheets pass said read head before said sheets pass said treatment station and said read head further being mechanically aligned with said treatment station so that, when said read head is centered on said code line, said treatment station is centered on said code line; and a controller operatively connected to said read head, said controller analyzing signals from said read head to determine whether said read head is centered on said magnetic ink markings in said code line as said sheets pass said read head and, based on said analyzing, automatically adjusting a position of said read head in order to ensure that said treatment station is centered on said code line when said sheets subsequently pass said treatment station, said controller including a low pass filter that filters a signal received from said read head.

7. The apparatus according to claim 6, said controller determining whether said read head is centered on said magnetic ink markings based upon a strength of a signal received from said read head.

8. The apparatus according to claim 6, said chemical treatment performed by said treatment station preparing said blank region of said sheets to receive additional magnetic ink markings.

9. The apparatus according to claim 6, said magnetic ink markings comprising magnetic ink character recognition (MICR) markings.

10. The apparatus according to claim 6, said sheets comprising negotiable instruments subjected to automated processing.

11. An apparatus comprising:

a sheet path transporting sheets;

a magnetic ink marking station positioned along said sheet path, said magnetic ink marking station placing magnetic ink markings in a code line on said sheets, said code line further having a blank region aligned with said magnetic ink markings;

a treatment station positioned along said sheet path, said treatment station applying a chemical treatment to said blank region as said sheets pass along said sheet path;

at least one read head, said read head being positioned along said sheet path such that said sheets pass said read head before said sheets pass said treatment station and said read head further being mechanically aligned with said treatment station so that, when said read head is centered on said code line, said treatment station is centered on said code line; and a controller operatively connected to said read head, said controller analyzing signals from said read head to determine whether said read head is centered on said magnetic ink markings in said code line as said sheets pass said read head and, based on said analyzing, automatically adjusting a position of said read head in order to ensure that said treatment station is centered on said code line when said sheets subsequently pass said treatment station.

12. The apparatus according to claim 11, said controller determining whether said read head is centered on said magnetic ink markings based upon a strength of a signal received from said read head.

13. The apparatus according to claim 11, said chemical treatment performed by said treatment station preparing said blank region of said sheets to receive additional magnetic ink markings.

14. The apparatus according to claim 11, said magnetic ink markings comprising magnetic ink character recognition (MICR) markings.

15. The apparatus according to claim 11, said magnetic ink marking station comprising one of an Xerographic and electrostatic marking station.

16. An apparatus comprising:

a sheet path transporting sheets, said sheets having a code line and said code line having magnetic ink markings and a blank region aligned with said magnetic ink markings;

a treatment station positioned along said sheet path, said treatment station applying a chemical treatment to said blank region as said sheets pass along said sheet path;

at least two read heads, said read heads being positioned along said sheet path such that said sheets pass said read heads before said sheets pass said treatment station and said read heads being mechanically aligned with said treatment station; and a controller operatively connected to said read heads, said controller analyzing signals from said read heads to determine whether said read heads are misaligned relative to said magnetic ink markings and to determine a direction of misalignment according to a difference between signals produced by said read heads and, based on said analyzing, automatically adjusting a position of said read heads to ensure that said treatment station is centered on said code line when said sheets subsequently pass said treatment station.

17. The apparatus according to claim 16, said controller determining whether said read heads are misaligned and said direction of misalignment based upon a strength of a signal received from said read heads.

18. The apparatus according to claim 16, said chemical treatment performed by said treatment station preparing said blank region of said sheets to receive additional magnetic ink markings.

19. The apparatus according to claim 16, said magnetic ink markings comprising magnetic ink character recognition (MICR) markings.

20. The apparatus according to claim 16, said sheets comprising negotiable instruments subjected to automated processing.

* * * * *